(12) United States Patent
Hayek et al.

(10) Patent No.: US 10,955,267 B2
(45) Date of Patent: Mar. 23, 2021

(54) SENSOR DEVICE

(71) Applicant: Robert Bosch GmbH, Stuttgart (DE)

(72) Inventors: Jan Hayek, Munich (DE); Dorde Cvejanovic, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 442 days.

(21) Appl. No.: 15/971,720

(22) Filed: May 4, 2018

(65) Prior Publication Data

US 2018/0335322 A1 Nov. 22, 2018

(30) Foreign Application Priority Data

May 18, 2017 (DE) .......................... 102017208361.1

(51) Int. Cl.
*G01D 9/00* (2006.01)
*G01D 21/00* (2006.01)
*H04W 56/00* (2009.01)

(52) U.S. Cl.
CPC ............. *G01D 9/005* (2013.01); *G01D 21/00* (2013.01); *G08C 2201/12* (2013.01); *H04W 56/00* (2013.01)

(58) Field of Classification Search
CPC .................................................... H04W 56/00
See application file for complete search history.

(56) References Cited

U.S. PATENT DOCUMENTS

| | | | |
|---|---|---|---|
| 2015/0123827 A1* | 5/2015 | Claus ..................... | G01D 9/005 341/122 |
| 2016/0132091 A1* | 5/2016 | Bodner ..................... | G06F 1/06 713/323 |

* cited by examiner

*Primary Examiner* — Gregory J Toatley, Jr.
*Assistant Examiner* — Terence E Stifter, Jr.
(74) *Attorney, Agent, or Firm* — Norton Rose Fulbright US LLP; Gerard Messina

(57) ABSTRACT

A sensor device includes an oscillator element that is suppliable with a trigger signal, an activation and deactivation of at least one sensor element of the sensor device being initiatable with the aid of the trigger signal and an activation element, and at least one piece of sensor data of the at least one sensor element being storable in a register after the at least one sensor element is activated; and an interface connected to the register and via which the piece of sensor data is transmittable to the control device.

8 Claims, 3 Drawing Sheets

SENSOR DEVICE

CROSS-REFERENCE TO RELATED APPLICATIONS

The present application claims priority under 35 U.S.C. § 119 to DE 10 2017 208 361.1, filed in the Federal Republic of Germany on May 18, 2017, the content of which is hereby incorporated by reference herein in its entirety.

FIELD OF THE INVENTION

The present invention relates to a sensor device and to a method for manufacturing a sensor device.

BACKGROUND

Known sensors in the form of rotation rate sensors, acceleration sensors, magnetometers, combination sensors (inertial measurement units (IMUs)), etc., have a low-power mode in which almost all components of the sensor are "put to sleep," i.e., placed in a so-called sleep mode, at regular intervals. In the process, an electrical energy supply to individual components is completely switched off. Digital components are separated by a central clock, thus reducing dynamic electrical power consumption. A clock frequency, which is necessary for reawakening the sensor at the right time, is thereby reduced to a minimum. In this sleep state, generally only the component that is necessary for reawakening the sensor after a defined period or for allowing interface components external access to the sensor (for example, to reconfigure the sensor, read out data, or the like) is active.

Other known sensors operate autonomously, with necessary clock signals, from which all time signals are derived, being generated internally. In principle, this clock signal is not synchronous with the clock signal of the system to which the sensor is connected (host). When times are derived from this asynchronous clock signal (for example, in order to set a defined sensor data rate), these times often deviate from the time of the host ("jitter"). Depending on the system, this jitter may represent a major problem for which compensation is difficult. One possible approach for eliminating the disadvantages due to jitter is to provide the sensor with the option for adapting to the host via a synchronization signal from the host to the sensor.

SUMMARY

An object of the present invention is to provide an improved sensor device. According to a first aspect, the object is achieved with a sensor device that includes: an oscillator element that is suppliable with a trigger signal; at least one sensor element, activation of which can be initiated with the aid of the trigger signal and an activation element; a register in which at least one piece of sensor data of the at least one sensor element is storable after the at least one sensor element is activated; and an interface that is connected to the register and with the aid of which the piece of sensor data is transmittable to a control device situated externally to the sensor device.

A so-called trigger sleep mode on the sensor device is thus advantageously achieved, via which the sensor device is only externally activatable and deactivatable. It is advantageous that no clock and no clock pulse for controlling the clock are necessary within the sensor device, as the result of which dynamic electrical power consumption of the sensor device is advantageously significantly reduced.

According to a second aspect, the object is achieved with a method for manufacturing a sensor device, including the steps of: providing an oscillator element in such a way that the oscillator element is suppliable with a trigger signal, where an activation of at least one sensor element of the sensor device is initiatable with the aid of the trigger signal and an activation element; providing a register in which at least one piece of sensor data of the at least one sensor element is storable after the at least one sensor element is activated; and providing an interface that is connected to the register and with the aid of which the piece of sensor data is transmittable to a control device situated externally to the sensor device.

One advantageous refinement of the sensor device is characterized in that the sensor device is suppliable with the trigger signal from the control device. In this way, the external control device can determine when it wants to be provided with sensor data from the sensor device.

Another advantageous refinement of the sensor device is characterized in that the sensor device is internally suppliable with the trigger signal. An alternative type of activation of the sensor device is provided in this way.

Other advantageous refinements of the sensor device are characterized in that the register is designed as a FIFO system or includes a FIFO system. A FIFO system advantageously allows the storage of older sensor data; i.e., the external control device can trigger multiple measurements without retrieving the data after the measurement. These data are then stored in the FIFO system, and can be read out in a single read operation. Without a FIFO system, only the most recent measuring data are available, which are overwritten by a new measurement.

The present invention together with further features and advantages is described in greater detail below with reference to several figures. Provided device features analogously result from corresponding provided method features, and vice versa. This means in particular that features, technical advantages, and statements concerning the sensor device analogously result from corresponding features, technical advantages, and statements concerning the method for manufacturing a sensor device, and vice versa.

DETAILED DESCRIPTION

Figure 1:
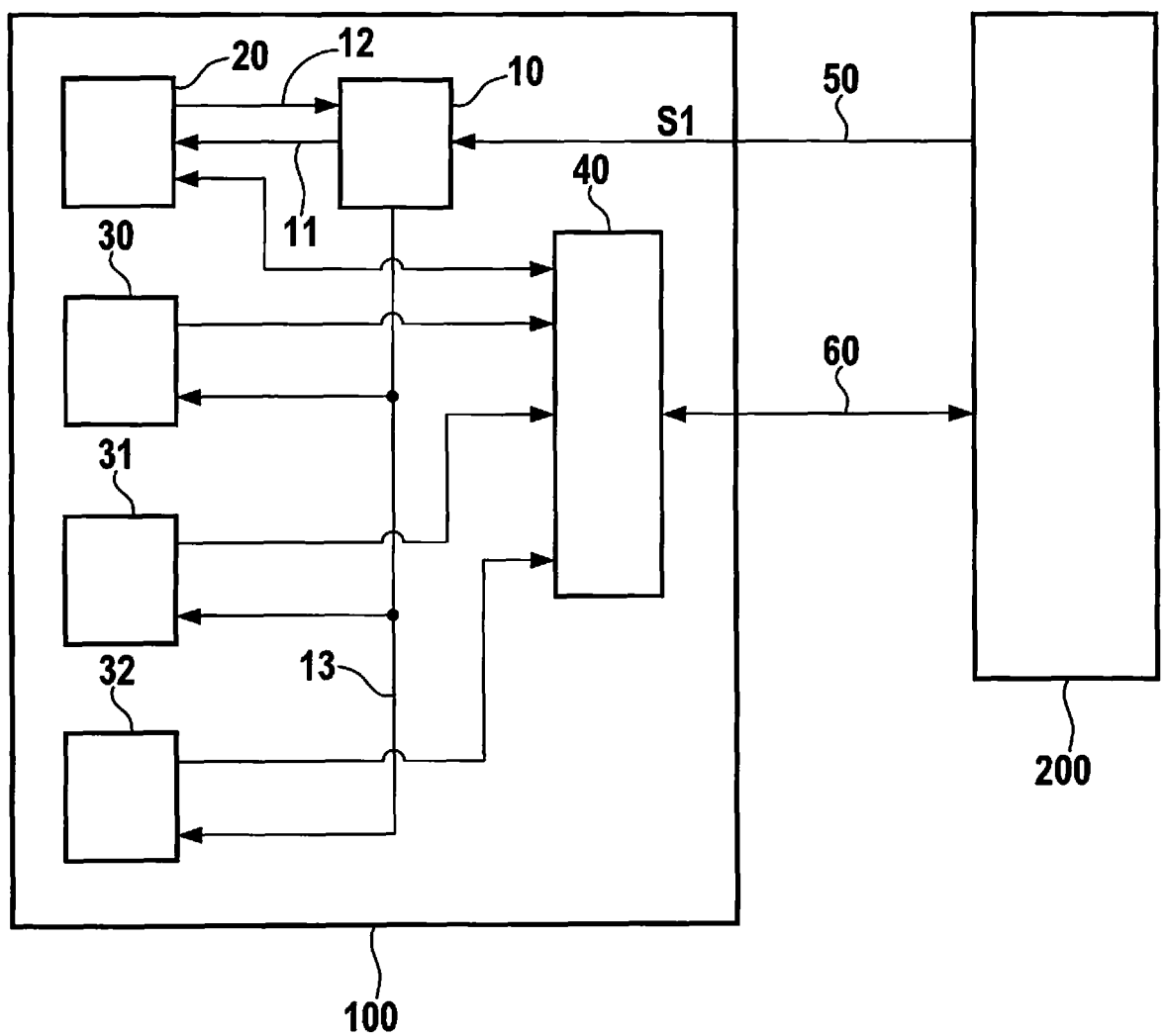
FIG. 1 is a block diagram of a sensor device according of an example embodiment of the present invention.

FIG. 1 is a schematic block diagram of an example embodiment of a sensor device 100, which can be connected to, and functionally interact with, an external control device 200. Sensor device 100 and control device 200 can be interconnected in a mobile telephone, for example.

Sensor device 100 includes an internal oscillator element 10 (RC oscillator, quartz, etc.). Oscillator element 10 can be supplied with a trigger signal S1 from an external control device 200 via a line 50. As a response to arriving trigger signal S1, oscillator element 10 transmits a signal to an activation element 20 via a line 11, oscillator element 10 being activated with the aid of activation element 20 via a line 12, and a clock signal thus being generated.

Oscillator element 10 subsequently outputs the clock signal to at least one sensor element 30, 31, 32 via a line 13. In FIG. 1, three sensor elements 30, 31, 32 by way of example are supplied with the clock signal via line 13, as the result of which sensor elements 30, 31, 32 carry out their sensor measurements and store the sensor data, thus detected, in a register 40.

Register 40 is connected to an interface device 60, via which the sensor data can be transmitted to external control device 200. Interface device 60 can be designed, for example, as a conventional I2C interface or as a conventional SPI interface.

Register 40 can optionally also include an asynchronous FIFO system (first in first out). For reading out the mentioned sensor data from register 40, it is advantageous that no internal clock signal of sensor device 100 is necessary, since a clock signal that is necessary for reading out register 40 is provided by interface device 60.

As a result, with the aid of trigger signal S1 and activation element 20, sensor device 100 is active only in temporally defined phases, and can be externally activated for carrying out the sensor measurements.

One design of sensor device 100, not illustrated in the figures, provides that the trigger signal is derived from internal register 40 or is provided by same, the emission of the trigger signal with the aid of the register being initiated by external control device 200 via interface device 60.

Figure 2:
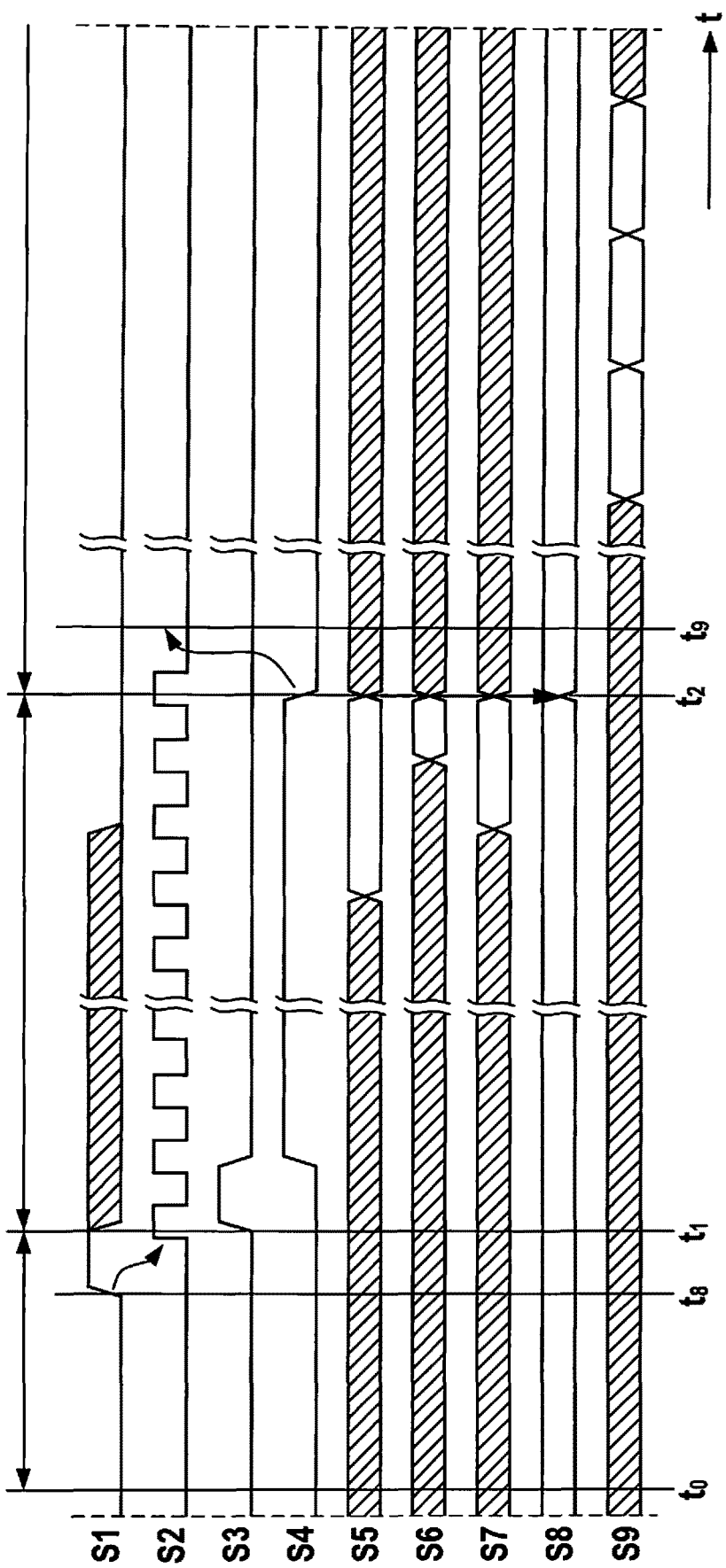
FIG. 2 is a diagram with time curves of signals for controlling the provided sensor device according to an example embodiment of the present invention.

A more detailed time curve of the above-described operation of sensor device 100 is illustrated in FIG. 2.

A total of nine signals S1 ... S9, provided for operating provided sensor device 100, are apparent. Sensor device 100 is in a sleep mode at a point in time $t_0$. With the aid of external trigger signal S1 at point in time $t_8$, clock signal S2 is activated at a point in time $t_1$, and is active as long as an enable signal S4, output by activation element 20, is at a high level. Together with activated clock signal S2, a high pulse is generated in a wakeup signal S3.

Enable signal S4 is cancelled at a point in time $t_2$, when all sensor elements 30, 31, 32 have delivered a piece of sensor data. As a result, clock signal S2 is switched off at a point in time $t_9$, as the result of which sensor device 100 once again places itself in the sleep mode.

Signal S8 represents the sensor data stored in register 40.

Signal S9 represents data of interface device 60, via which the sensor data are transmitted to external control device 200. For example, control device 200 can retrieve the sensor data via interface device 60 as needed.

It is apparent from FIG. 2 that sensor device 100 is in the sleep mode between $t_0$ and $t_8$. Sensor device 100 switches from the sleep mode into an active mode at point in time $t_8$, sensor device 100 is in the active mode between $t_1$ and $t_2$, sensor device 100 automatically switches from the active mode into the sleep mode between $t_2$ and $t_9$, and sensor device 100 is once again in the sleep mode beginning at point in time $t_2$.

It is thus apparent that sensor device 100 transfers itself into the sleep mode at the earliest possible point in time when all sensor data are present.

As a result, sensor device 100 generates clock signal S2 only in the active mode between $t_1$ and $t_9$, thus greatly reducing electrical energy consumption of sensor device 100. External control device 200 thus advantageously determines points in time at which it wants to have sensor data provided, and is not dependent on points in time at which sensor device 100 generates the sensor data. This means that sensor device 100 is switched on only for the minimum time necessary (between $t_1$ and $t_2$), and sensor device 100 can independently decide when it is through with providing the sensor data and can go into the sleep mode.

A long useful life of mobile terminals, or devices operated with the aid of batteries or rechargeable batteries, that are equipped with sensor device 100 is advantageously supported in this way.

Figure 3:
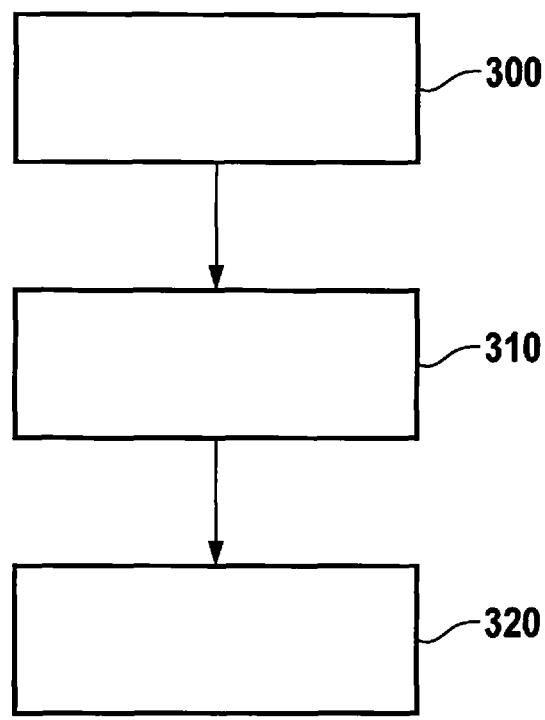
FIG. 3 is a flowchart schematically showing a sequence of a method for manufacturing a sensor device according to an example embodiment of the present invention.

FIG. 3 shows a schematic sequence of a method for manufacturing a sensor device 100. Providing an oscillator element 10 is carried out in a step 300 in such a way that oscillator element 10 is suppliable with a trigger signal, an activation of at least one sensor element 30, 31, 32 of sensor device 100 being initiatable with the aid of the trigger signal and an activation element 20.

In a step 310, a register 40, in which at least one piece of sensor data of the at least one sensor element 30, 31, 32 is storable after the at least one sensor element 30, 31, 32 is activated, is provided.

Providing an interface device 60 that is connected to register 40, and with the aid of which the piece of sensor data is transmittable to control device 200, is carried out in a step 320.

The sequence of steps 300, 310, and 320 is arbitrary.

In another variant of sensor device 100 not illustrated in the figures, it can be provided that sensor device 100 additionally includes elements for being placed in the sleep mode.

In the two alternatives mentioned above, the activation operation according to the present invention can have a configurable design with the aid of the trigger signal, using software.

In summary, a sensor device is provided with the present invention, which has low electrical energy consumption, and for which a sensor functionality can be activated by an external control device, for example in the form of a microcontroller. As a result, the sensor device is awakened only when it is supplied with an external trigger signal, and deactivates itself in the shortest possible time after generating the sensor data, so that a type of energy-saving "operation on demand" of the sensor functionality is provided.

Those skilled in the art can also implement specific embodiments of the present invention that are not disclosed or only partly disclosed above, without departing from the core of the present invention.

What is claimed is:

1. A sensor device comprising:
   an oscillator;
   an activation element, wherein:
      in response to a trigger signal, the oscillator is configured to output a clock signal and the activation element is configured to switch an activation signal to an active level; and
      the oscillator is configured to continue outputting the clock signal until the activation signal is switched from the active level to an inactive level;
   at least one sensor element, wherein:
      the at least one sensor is configured to output sensor data in response to the clock signal; and
      the activation element is configured for the activation signal to be switched from the active level to the inactive level in response to at least one piece of the sensor data being output from each of the at least one sensor after the trigger signal is obtained by the sensor device;

a register in which the at least one piece of the sensor data of the at least one sensor element is storable; and an interface that is connected to the register and via which the at least one piece of the sensor data is transmittable to a control device that is external to the sensor device.

2. The sensor device of claim 1, wherein the sensor device is suppliable with the trigger signal from the control device.

3. The sensor device of claim 1, wherein the sensor device is internally suppliable with the trigger signal.

4. The sensor device of claim 1, wherein the register is a FIFO system.

5. The sensor device of claim 1, wherein the register includes a FIFO system.

6. A method for manufacturing a sensor device, the method comprising:
   providing an oscillator;
   providing an activation element;
   providing at least one sensor element;
   providing a register; and
   providing an interface that is connected to the register;
   wherein:
      in response to a trigger signal, the oscillator is configured to output a clock signal and the activation element is configured to switch an activation signal to an active level;
      the oscillator is configured to continue outputting the clock signal until the activation signal is switched from the active level to an inactive level;
      the at least one sensor element is configured to output sensor data in response to the clock signal;
      the activation element is configured for the activation signal to be switched from the active level to the inactive level in response to at least one piece of the sensor data being output from each of the at least one sensor after the trigger signal is obtained by the sensor device;
      the sensor device is configured to store the at least one piece of the sensor data of the at least one sensor element in the register; and
      the at least one piece of the sensor data is transmittable to a control device that is external to the sensor device via the interface.

7. The method of claim 6, wherein the register is or includes a FIFO system.

8. A sensor device comprising:
   an oscillator;
   an activation element; and
   at least one sensor element;
   wherein:
      in response to a trigger signal, the oscillator is configured to:
         wake the activation element; and
         output a clock signal in response to which the at least one sensor is configured to produce sensor data;
      the activation element is configured to output an activation signal at an active level in response to the waking of the activation element by the oscillator; and
      the oscillator is configured to stop the output of the clock signal in response to the activation signal being switched from the active level, which has been set in response to the waking of the of the activation element by the oscillator, to an inactive level.

* * * * *